US009640043B1

(12) United States Patent
Dockrey et al.

(10) Patent No.: US 9,640,043 B1
(45) Date of Patent: May 2, 2017

(54) REMOTE DISPLAY DEVICE FOR USE IN A METROLOGY PERSONAL AREA NETWORK

(71) Applicant: Mitutoyo Corporation, Kanagawa-ken (JP)

(72) Inventors: Matthew Raymond Dockrey, Seattle, WA (US); Casey Edward Emtman, Kirkland, WA (US); Eric T. Noble, Gig Harbor, WA (US); Darren Wayne Robinson, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 15/077,701

(22) Filed: Mar. 22, 2016

Related U.S. Application Data

(63) Continuation-in-part of application No. 14/975,449, filed on Dec. 18, 2015.

(51) Int. Cl.
  *G08B 21/00* (2006.01)
  *G08B 5/22* (2006.01)
  (Continued)

(52) U.S. Cl.
  CPC .............. *G08B 5/223* (2013.01); *G01B 5/02* (2013.01); *H04W 4/008* (2013.01)

(58) Field of Classification Search
  None
  See application file for complete search history.

(56) References Cited

U.S. PATENT DOCUMENTS

| 4,930,096 A | 5/1990 | Shimizu et al. |
| 4,973,957 A | 11/1990 | Shimizu et al. |

(Continued)

FOREIGN PATENT DOCUMENTS

EP 0 974 808 B1 9/2003

OTHER PUBLICATIONS

Tomer Lanzman, "Digital Readout Caliper2PC," Caliper2PC, retrieved from http://www.caliper2pc.de/produkte/caliper2pc/digitalreadout.html, Jan. 26, 2016, 4 pages.
(Continued)

*Primary Examiner* — Adolf Dsouza
(74) *Attorney, Agent, or Firm* — Seed IP Law Group LLP

(57) ABSTRACT

A remote display device for displaying real time measurement values is configured to operate as a device in a metrology personal area network ("MPAN") which also includes a dimensional metrology user interface device and one or more dimensional metrology measurement devices (e.g., calipers, etc.). In various implementations, the remote display device is configured to be operable in either a first mode (e.g., a slave mode) or a second mode (e.g., an independent mode). In a slave mode, the remote display device is responsive to control instructions that are received from the dimensional metrology user interface device to configure a display of real time measurement values from one or more of the measurement devices. In an independent mode, the remote display device is configurable to display real time measurement values from one or more of the measurement devices without receiving control instructions from the dimensional metrology user interface device.

27 Claims, 14 Drawing Sheets

(51) Int. Cl.
*H04W 4/00* (2009.01)
*G01B 5/02* (2006.01)

(56) References Cited

U.S. PATENT DOCUMENTS

| | | | |
|---|---|---|---|
| 6,502,057 | B1 | 12/2002 | Suzuki |
| 7,715,885 | B2 | 5/2010 | Arunan et al. |
| 8,452,456 | B2 | 5/2013 | Devineni et al. |
| 8,581,855 | B2 | 11/2013 | Spink et al. |
| 8,655,280 | B2 | 2/2014 | Hillyard et al. |
| 8,978,263 | B2 | 3/2015 | Nahum et al. |
| 2006/0162178 | A1 | 7/2006 | Freidin |
| 2010/0077105 | A1 | 3/2010 | Chung et al. |
| 2012/0229662 | A1 | 9/2012 | Lankalapalli et al. |
| 2013/0343350 | A1 | 12/2013 | Weinrib et al. |
| 2015/0097671 | A1 | 4/2015 | Laflen et al. |
| 2015/0177729 | A1* | 6/2015 | Atherton .............. G05B 19/401 700/180 |
| 2015/0247745 | A1 | 9/2015 | McClogan |

OTHER PUBLICATIONS

Haglöf, "New—The MD II Mantax Digitech II," *Haglöf of Sweden*, Oct. 15, 2015, retrieved from http://www.haglof.se/index.php/en/files/leaflets/42-md-ii-caliper-product-sheet, on Jan. 26, 2016, 2 pages.

Microtech, "Our Production: Bluetooth force caliper MICROTECH® production," *Microtech PSME*, retrieved from http://www.microtech.ua/index.php?lang=en&module=catalog&category=724, on Jan. 26, 2016, 2 pages.

Microtech, "Our Production: Connecting equipment to PC MICROTECH® production," *Microtech PSME*, retrieved from http://www.microtech.ua/index.php?lang=en&module=catalog&category=67, on Jan. 26, 2016, 3 pages.

Microtech, "Our Production: Tablet force caliper MICROTECH® production," *Microtech PSME*, retrieved from http://www.microtech.ua/index.php?lang=en&module=catalog&category=725, on Jan. 26, 2016, 2 pages.

"Microtech Catalog," retrieved from www.microtech.ua, iso 9001:2008, published as early as 1995, 29 pages.

Motionics, LLC, "Wireless Measurement Read (WiMER)," 2015, retrieved from www.motionics.com/downloads/WiMER-1, on Feb. 11, 2016, 1 page.

Gaging & Software Technologies, Inc., "Mitutoyo 12" Caliper Portable Data Collector—GreatGages, GreatGages.com, retrieved from http://www.greatgages.com/products/mitutoyo-12-caliper-portable-data-collector, on Jan. 26, 2016, 5 pages.

Yuriy Krushelnytskiy, "Android Dro Project," *Yuriy's Toys*, retrieved from http://www.yuriystoys.com/p/android-dro.html, on Jan. 26, 2016, 3 pages.

Mititoyo American Coporation, "Measurement Data Wireless Communication System U-WAVE®," Bulletin No. 1991, 0410-05, Jul. 2010, 12 pages.

\* cited by examiner

REMOTE DISPLAY DEVICE FOR USE IN A METROLOGY PERSONAL AREA NETWORK

CROSS-REFERENCE TO RELATED APPLICATION(S)

This application is a continuation-in-part of U.S. patent application Ser. No. 14/975,449, entitled "MULTI-MODE METROLOGY USER INTERFACE DEVICE" filed on Dec. 18, 2015, the disclosure of which is hereby incorporated herein by reference in its entirety.

BACKGROUND

Technical Field

This disclosure relates to precision metrology, and more particularly to devices of a metrology personal area network configured to display measurement values from dimensional metrology measurement devices.

Description of the Related Art

Various manufacturing devices such as milling machines or lathes are equipped with linear scales or other dimensional metrology measurement devices for measuring a position of a machine tool or a workpiece. For example, Mitutoyo model AT116 or AT715 linear scales may be configured to detect an absolute position using inductive sensing and output a signal indicative of the absolute position. Such linear scales may be configured to communicate position measurements through a digital read out (DRO) system. A typical DRO system may include a digital display to show the measured position. For example, a Mitutoyo KA Counter system may be configured as part of a DRO package to display a position of a linear scale coupled with a milling machine or a lathe.

Various handheld or portable dimensional metrology measurement devices are available such as calipers, micrometers or digital "dial" indicators, which may be configured to output data to external devices, such as a desktop computer. The data may be output through wired systems such as RS-232C communication, or wireless systems utilizing Bluetooth or other wireless communication technology. For example, a caliper such as a Mitutoyo ABS Digimatic Caliper model CD-15CX may use Mitutoyo U-WAVE wireless data communication to communicate with a computer configured with Mitutoyo MeasurLink software. Wireless connectivity may be provided by an external transmitter unit attached to a handheld or portable metrology tool. Examples of such systems are disclosed in U.S. Pat. Nos. 4,930,096 and 6,502,057.

In various applications, it may be desirable for a system to have improved capabilities and/or modes for communicating with and displaying measurement values from dimensional metrology measurement devices in order to provide additional convenience, speed and flexibility to an operator (e.g., for performing dimensional verification while manufacturing a workpiece).

BRIEF SUMMARY

This summary is provided to introduce a selection of concepts in a simplified form that are further described below in the Detailed Description. The summary is not intended to identify key features of the claimed subject matter, nor is it intended to be used as an aid in determining the scope of the claimed subject matter.

A remote display device for displaying real time measurement values is configured to operate as a device in a metrology personal area network ("MPAN") which also includes a dimensional metrology user interface device and one or more dimensional metrology measurement devices (e.g., calipers, micrometers, gauges, dial indicators, lathes, linear scales, etc.). In various implementations, each of the measurement devices may include at least one displacement or position sensor, while the dimensional metrology user interface device and the remote display device may not include displacement or position sensors. The dimensional metrology user interface device includes a user interface display which displays real time measurement values that are received from the one or more measurement devices and includes at least one control interface operable to transmit control instructions to devices connected to the MPAN.

The remote display device includes a control portion, a first display, a user interface portion and a communication portion. In various implementations, the control portion is configured to operate the remote display device in either a first mode (e.g., a slave mode) or a second mode (e.g., an independent mode). In a slave mode, the remote display device is responsive to control instructions that are received from the dimensional metrology user interface device to configure a display of real time measurement values from one or more of the measurement devices. In an independent mode, the remote display device is configurable to display real time measurement values from one or more of the measurement devices without receiving control instructions from the dimensional metrology user interface device.

DETAILED DESCRIPTION

Figure 1:
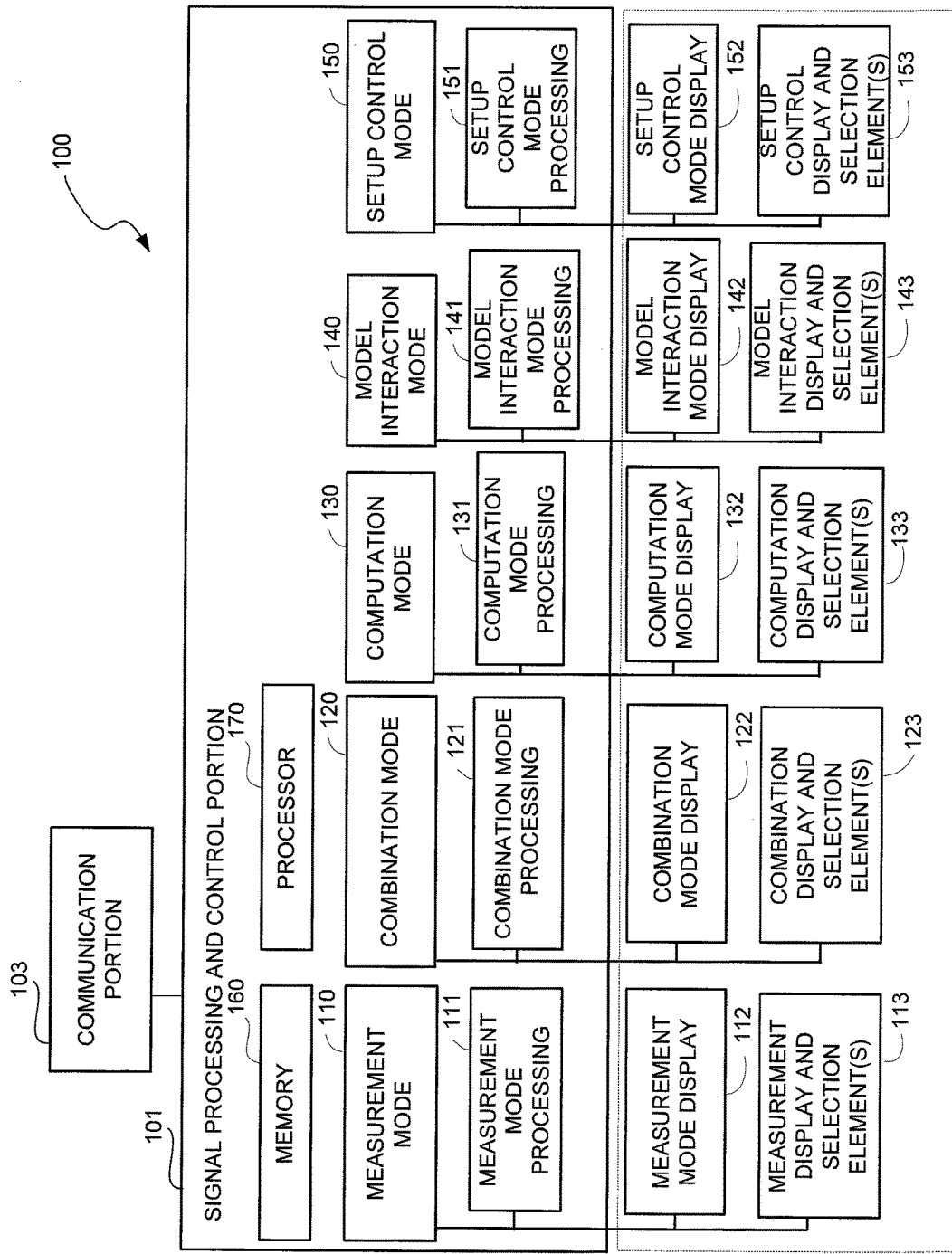
FIG. 1 is a block diagram of a multi-mode dimensional metrology user interface device.

FIG. 1 is a block diagram of a multi-mode dimensional metrology user interface device 100. The multi-mode dimensional metrology user interface device 100 comprises a signal processing and control portion 101, a user input interface portion 102, and a communication portion 103.

The signal processing and control portion 101 comprises a measurement display mode 110, a combination display mode 120, a computation mode 130, a model interaction mode 140, a setup control mode 150, a memory 160, and a processor 170. The measurement mode 110 comprises measurement mode processing 111. The combination display mode 120 comprises combination display mode processing 121. The computation mode 130 comprises computation display mode processing 131. The model interaction mode 140 comprises model interaction mode processing 141. The setup control mode 150 comprises setup control mode processing 151.

The user input interface portion 102 comprises a measurement mode display 112, a combination mode display 122, a computation mode display 132, a model interaction mode display 142, and a setup control mode display 152. The measurement mode display 112 comprises measurement display and selection elements 113. The combination mode display 122 comprises combination display and selection elements 123. The computation mode display 132 comprises computation display and selection elements 133. The model interaction mode display 142 comprises model interaction display and selection elements 143. The setup control mode display 152 comprises setup control display and selection elements 153.

The communication portion 103 may be configured to communicate with multiple types of dimensional metrology measurement devices through various wireless communication means such as Bluetooth, Wi-Fi, and cloud based data infrastructure. In various implementations, such communications may be performed as part of a metrology personal area network, wherein the dimensional metrology user interface device 100 and one or more measurement devices are configured as devices on the metrology personal area network. In this regard, the multi-mode dimensional metrology user interface device 100 may provide convenient and versatile means of displaying and interacting with data from multiple metrology sources in multiple modes as outlined in FIGS. 2-7.

Figure 2:
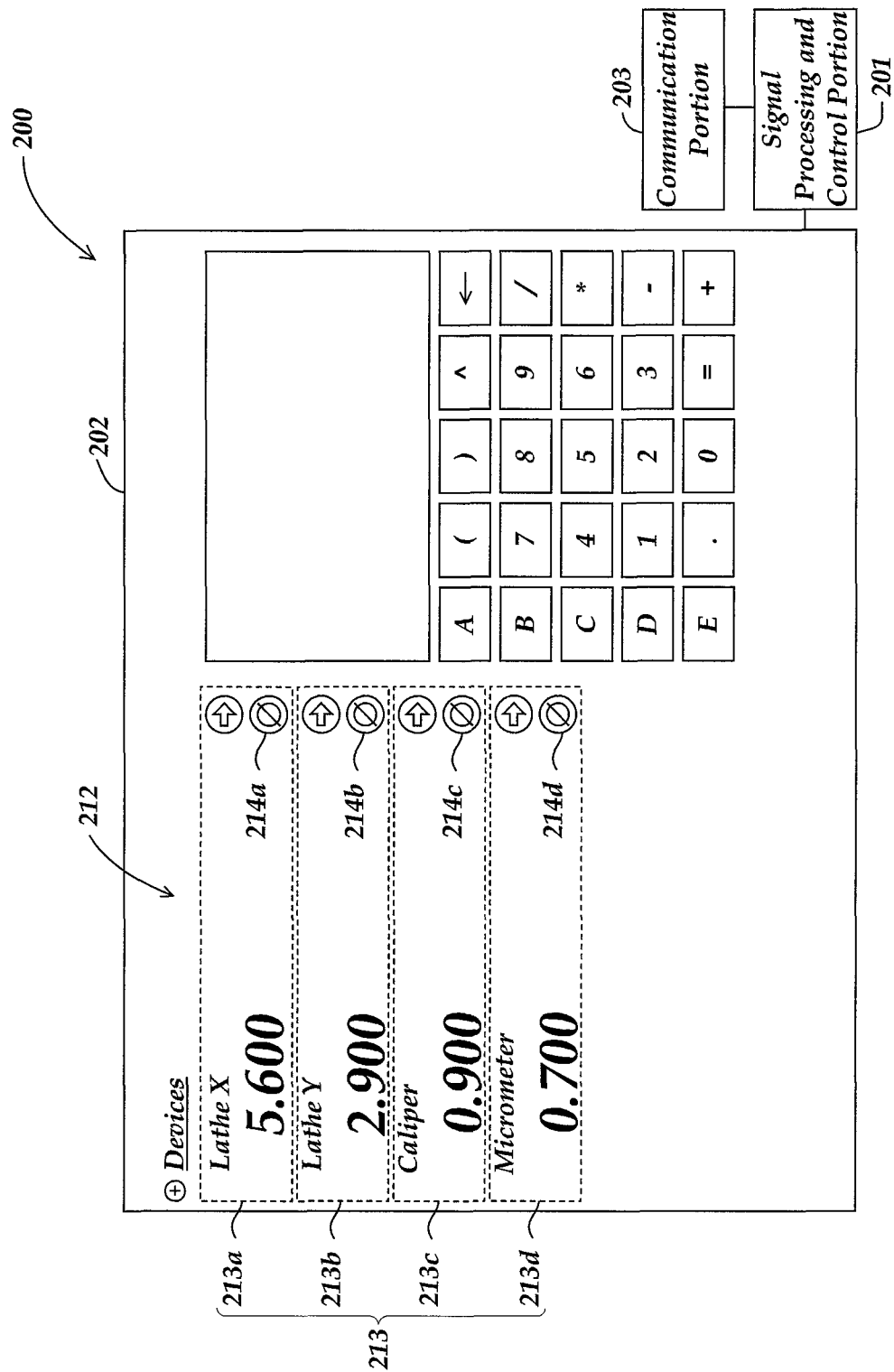
FIG. 2 is a schematic diagram of a multi-mode dimensional metrology user interface device operating in a measurement mode.

FIG. 2 is a schematic diagram of a multi-mode dimensional metrology user interface device 200 operating in a measurement mode (e.g., measurement mode 110) which comprises measurement mode processing (e.g., measurement mode processing 111). The multi-mode dimensional metrology user interface device 200 is similar or identical to the multi-mode dimensional metrology user interface device 100. The multi-mode dimensional metrology user interface device 200 comprises a control portion 201, a user input interface portion 202, and a communication portion 203.

The user input interface portion 202 comprises a measurement mode display 212. The measurement mode display 212 comprises measurement display and selection elements 213.

The measurement mode 110 is configured to display measurement values from multiple dimensional metrology measurement devices in the user input interface portion 202. More specifically, the measurement mode display 212 is configured to display measurements from multiple types of measurement devices such as lathes, calipers, micrometers or other measurement devices. As shown in FIG. 2, the measurement display and selection elements 213 comprise a lathe X measurement display and selection element 213a, a lathe Y measurement display and selection element 213b, a caliper measurement display and selection element 213c, and a micrometer display and selection element 213d which are each configured to display measurement values from their respective measurement devices. The lathe X measurement display and selection element 213a, the lathe Y measurement display and selection element 213b, the caliper measurement display and selection element 213c, and the micrometer display and selection element 213d each comprise respective zero setting selection elements 214a, 214b, 214c, 214d which are configured to set the measurement values to zero. This may assist a user in determining relative positions for a cut, for example, when operating a lathe tool.

In some embodiments, the multi-mode dimensional metrology user interface device 200 may comprise a touch screen, for example, on a tablet device. In some embodiments, the touch screen may be portable and the communication portion 203 may be configured with wireless communication (e.g., Bluetooth technology) in order to provide a convenient user interface that may be moved around a working environment.

Figure 3:
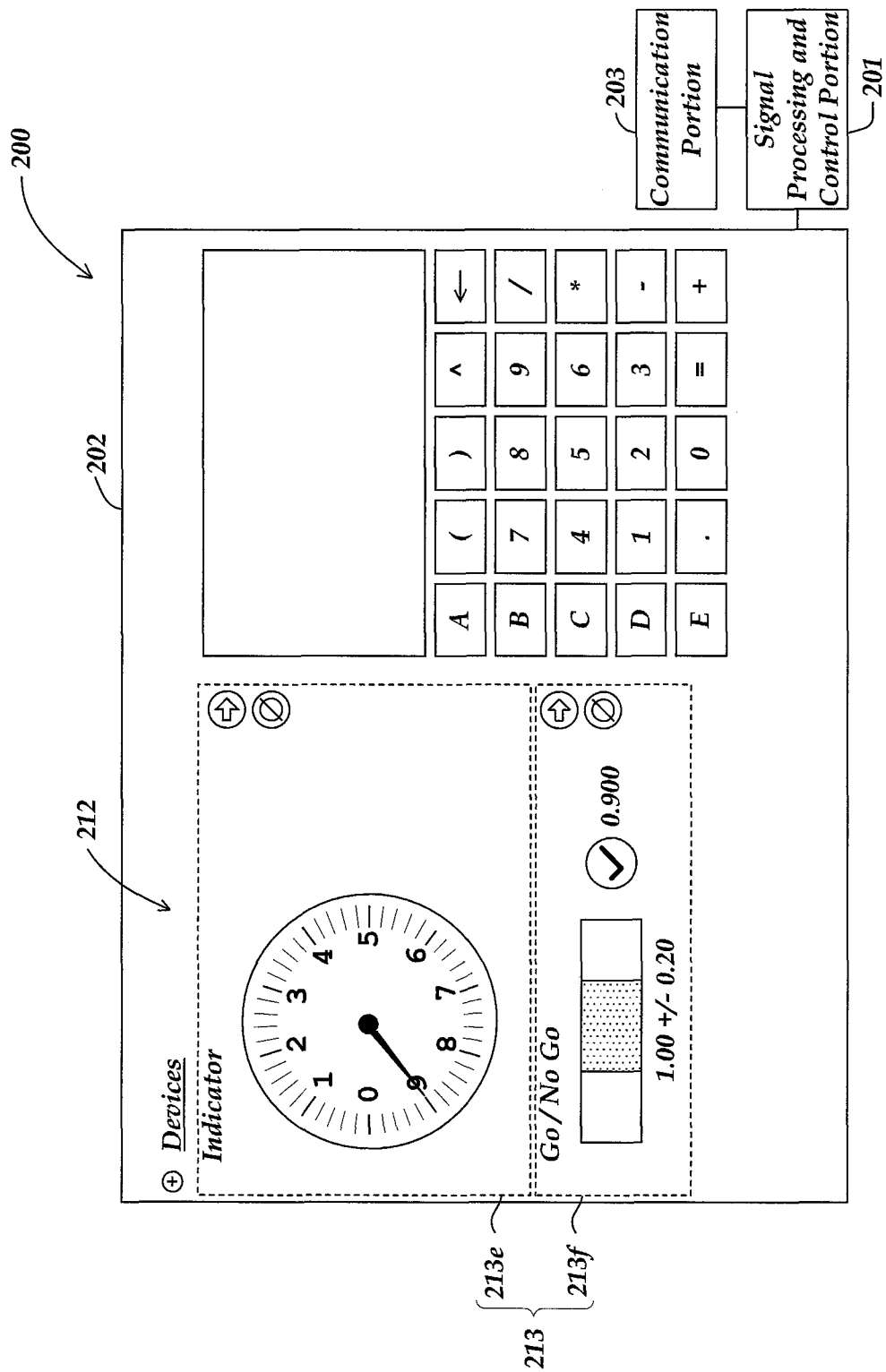
FIG. 3 is a schematic diagram of the multi-mode dimensional metrology user interface device of FIG. 2, showing additional features.

FIG. 3 is a schematic diagram of the multi-mode dimensional metrology user interface device 200 of FIG. 2, showing additional features. As shown in FIG. 3, the multi-mode dimensional metrology user interface device 200 additionally comprises an indicator display and selection element 213e and a tolerance range display element 213f. The indicator display and selection element 213e provides a display configured according to the structure of an analog dial indicator, which shows an analog representation of a measurement taken by an indicator. The tolerance range display element 213f shows whether a measurement is within a specified tolerance, i.e., in order to provide a "go/no-go" inspection tool. As shown in FIG. 3, the tolerance range display element 213f is configured to input the same indicator signal as the indicator selection element 213e. The tolerance range display element 213f shows that a measurement of 0.900 mm is within a tolerance range of 1.00 mm+/−0.20 mm, as indicated by a checkmark in a circle. In some embodiments, the checkmark may be displayed in a green circle. If a measurement is not within the tolerance range the tolerance range display element 213f may be configured to display an X in a red circle. It should be appreciated that other types of customized "go/no-go" inspection tools may be provided by the multi-mode dimensional metrology user interface device 200. For example, two indicators may be used to measure a step height which may be displayed for a specified tolerance using a similar tolerance range display element.

Figure 4:
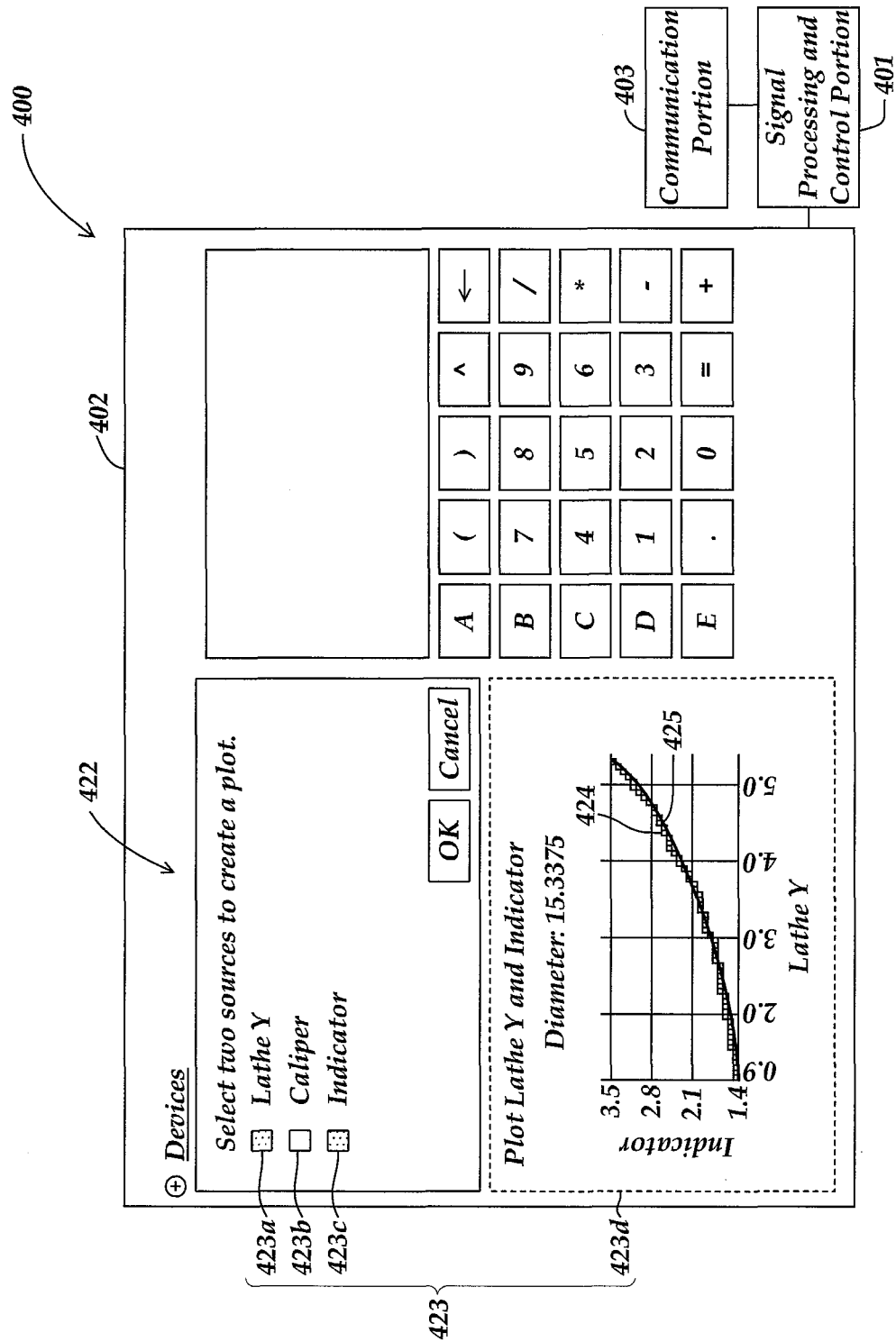
FIG. 4 is a schematic diagram of a multi-mode dimensional metrology user interface device operating in a combination mode.

FIG. 4 is a schematic diagram of a multi-mode dimensional metrology user interface device 400 operating in a combination mode (e.g., combination mode 120) which comprises combination mode processing (e.g., combination mode processing 121). The multi-mode dimensional metrology user interface device 400 is similar or identical to the multi-mode dimensional metrology user interface device 100. The multi-mode dimensional metrology user interface device 400 comprises a control portion 401, a user input interface portion 402 and a communication portion 403.

The user input interface portion 402 comprises a combination mode display 422. The measurement mode display 422 comprises combination display and selection elements 423. The combination display and selection elements 423 comprise a lathe Y display and selection element 423a, a caliper display and selection element 423b, an indicator display and selection element 423c, and a plot display element 423d.

The combination mode is configured to plot a graph of values from two measurement devices which may be selected by the combination display and selection elements 423. More specifically, the plot display element 423d is configured to show a graph of indicator values corresponding to lathe Y positions. A user may mount an indicator on a lathe carriage such that it is positioned to engage a workpiece, and move the lathe carriage while the multi-mode dimensional metrology user interface device 400 receives lathe Y signals and indicator signals through the communication portion 403, which may then be displayed as a set of coordinates 424 in the plot display element 423d.

In some embodiments, the combination mode may be configured to perform curve or line fitting. For example, a curve fit 425 may be applied to the set of coordinates 424 as shown in the plot display element 423d. The curve fit 425 may be utilized to determine a diameter of a round workpiece feature. The plot display element 423d shows a diameter of 15.3375 mm.

Figure 5:
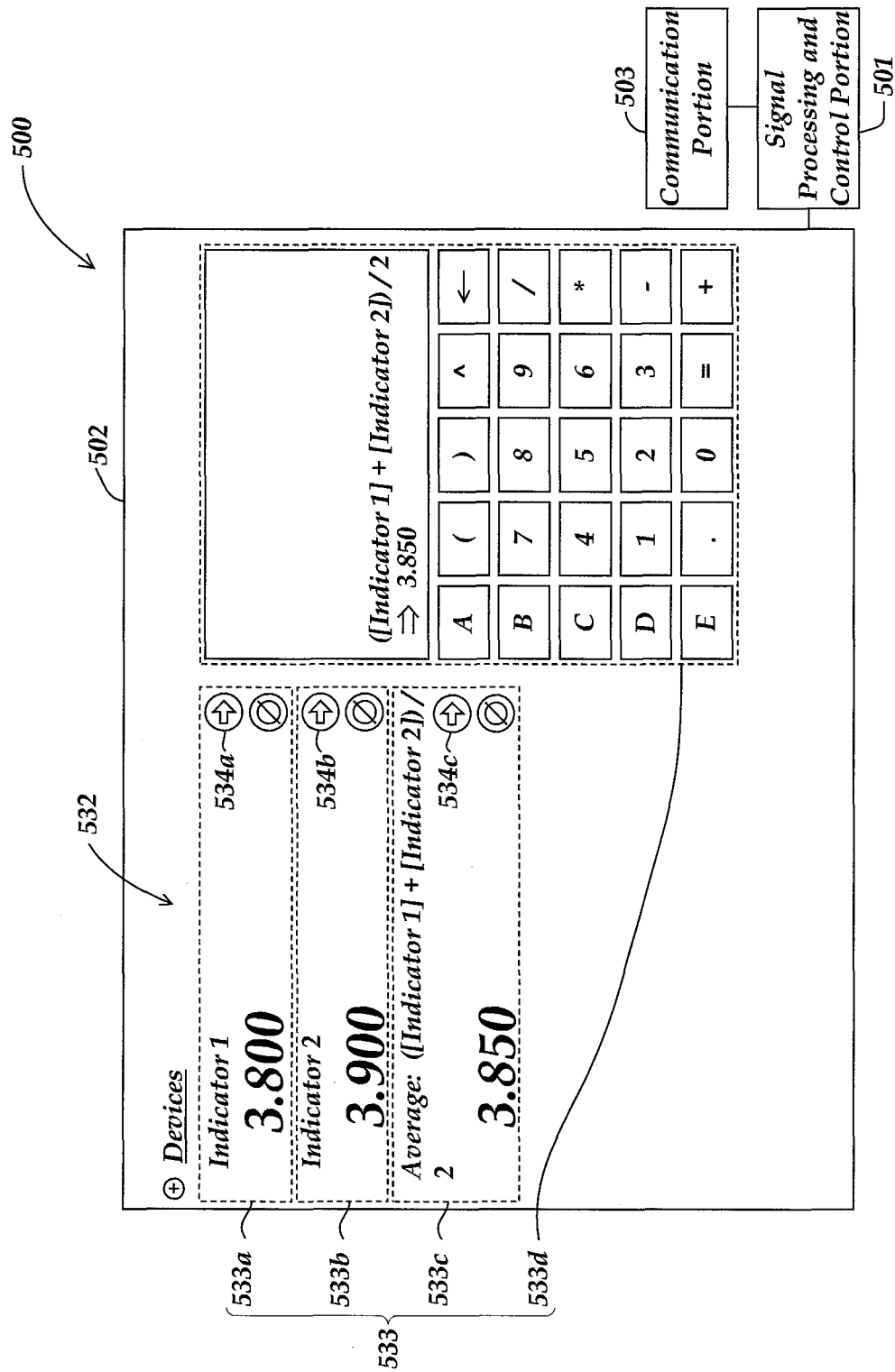
FIG. 5 is a schematic diagram of a multi-mode dimensional metrology user interface device operating in a computation mode.

FIG. 5 is a schematic diagram of a multi-mode dimensional metrology user interface device 500 operating in a computation mode (e.g., computation mode 130) which comprises computation mode processing (e.g., computation mode processing 131). The multi-mode dimensional metrology user interface device 500 is similar or identical to the multi-mode dimensional metrology user interface device 100. The multi-mode dimensional metrology user interface device 500 comprises a control portion 501, a user input interface portion 502 and a communication portion 503.

The user input interface portion 502 comprises a computation mode display 532. The computation mode display 532 comprises computation display and selection elements 533. The computation display and selection elements 533 comprise a first indicator computation display and selection element 533a, a second indicator computation display and selection element 533b, an average computation display and selection element 533c, and a computation calculator display and selection element 533d. Each of the first indicator computation display and selection element 533a, the second indicator computation display and selection element 533b, and the average computation display and selection element 533c comprises respective value input buttons 534a, 534b, 534c.

A user may construct a formula using the computation calculator display and selection element 533d which may input values the user selects by using the value input buttons 534a, 534b, 534c. For example, a user may select the first indicator computation display and selection element 533a and the second indicator computation display and selection element 533b as values to be averaged. By selecting the value input button 534a, a value "[Indicator 1]" appears in the computation calculator display and selection element 533d which represents a value input by the first indicator computation display and selection element 533a from a first electronic indicator. By selecting the value input button 534b, a value "[Indicator 2]" appears in the computation calculator display and selection element 533d which represents a value input by the second indicator computation display and selection element 533b from a second electronic indicator. The formula and result for this average may then be displayed, for example, by the average computation display and selection element 533c. The result may also be used as a "virtual" data source in a similar manner to the values of the first indicator computation display and selection element 533a and the second indicator computation display and selection element 533b.

Figure 6:
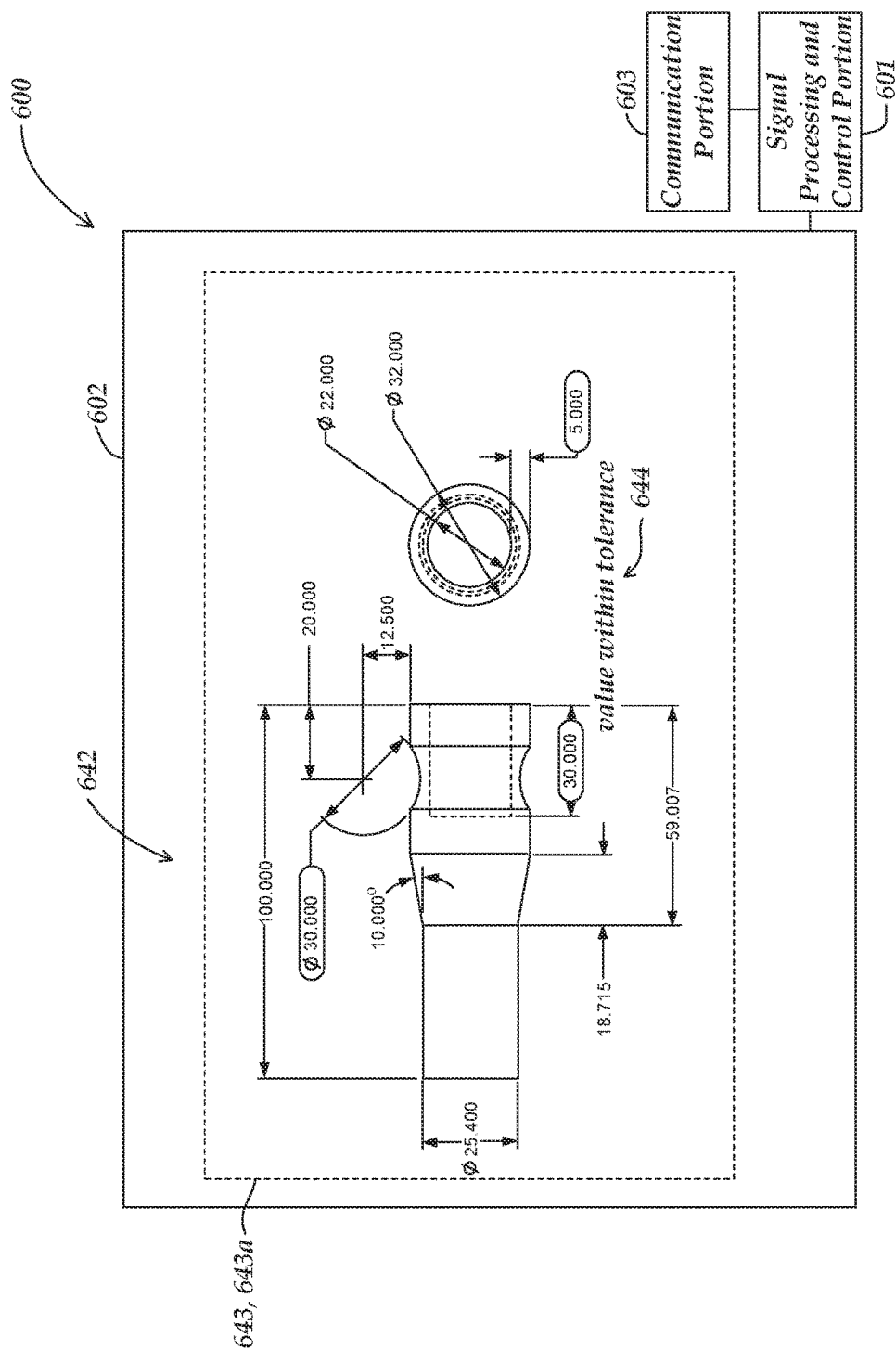
FIG. 6 is a schematic diagram of a multi-mode dimensional metrology user interface device operating in a model interaction mode.

FIG. 6 is a schematic diagram of a multi-mode dimensional metrology user interface device 600 operating in a model interaction mode (e.g., model interaction mode 140) which comprises model interaction mode processing (e.g., model interaction mode processing 141). The multi-mode dimensional metrology user interface device 600 is similar or identical to the multi-mode dimensional metrology user interface device 100. The multi-mode dimensional metrology user interface device 600 comprises a control portion 601, a user input interface portion 602, and a communication portion 603.

The user input interface portion 602 comprises a model interaction mode display 642. The computation mode display 642 comprises model interaction display and selection elements 643. The model interaction display and selection elements 643 comprise a model display and selector element 643a. The model display and selection element 643a may be configured to input a model of a workpiece. In various embodiments, the model may be a 2D drawing or a CAD model of the workpiece. A user may add an annotation to the model, such as a note of "value within tolerance" 644 or an actual value from a measurement input by the communication portion 603. An annotation may be added, for example, through a touchscreen keypad or a voice input.

Figure 7:
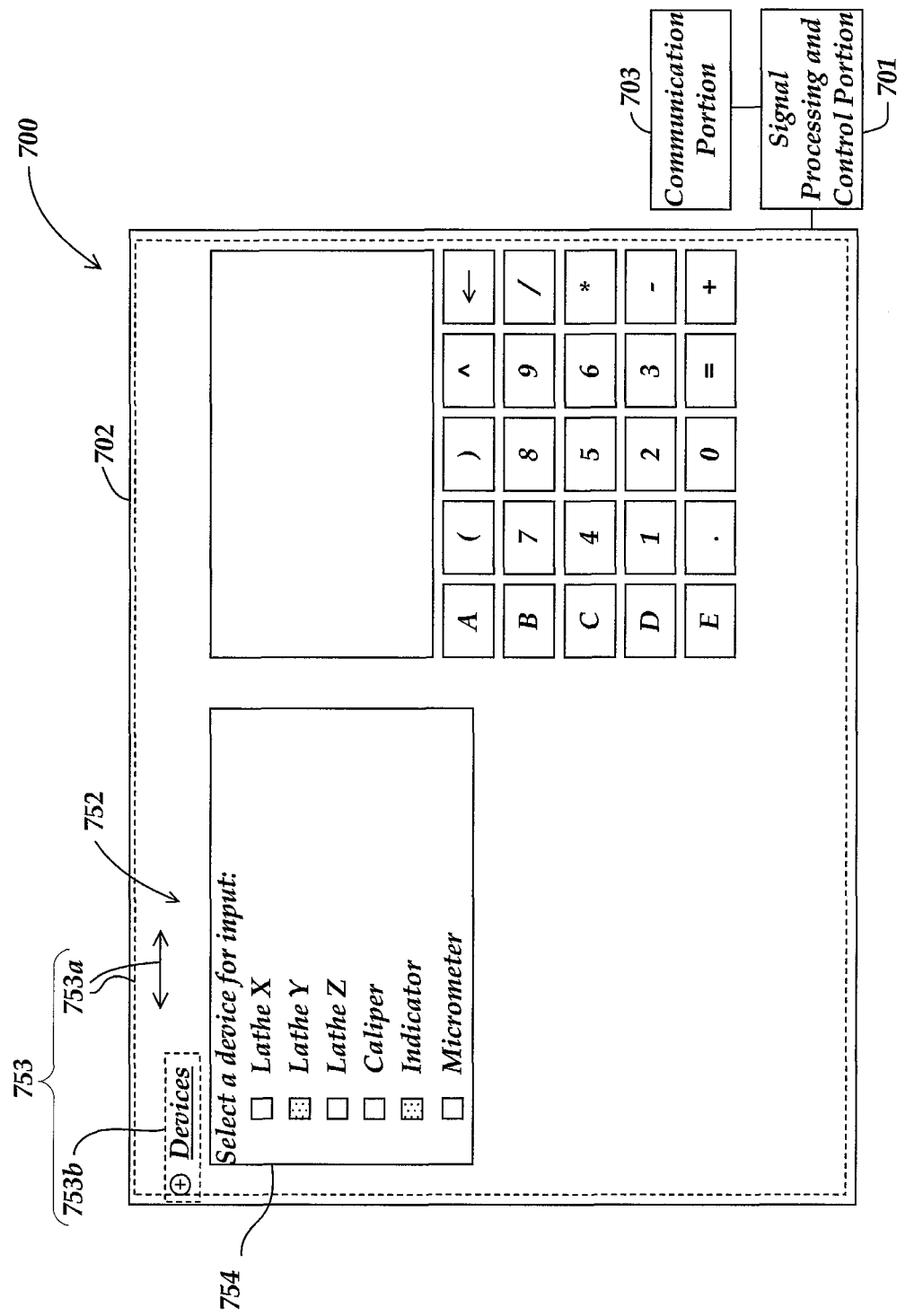
FIG. 7 is a schematic diagram of a multi-mode dimensional metrology user interface device operating in a setup control mode.

FIG. 7 is a schematic diagram of a multi-mode dimensional metrology user interface device 700 operating in a setup control mode (e.g., setup control mode 150) which comprises setup control mode processing (e.g., setup control mode processing 151). The multi-mode dimensional metrology user interface device 700 is similar or identical to the multi-mode dimensional metrology user interface device 100. The multi-mode dimensional metrology user interface device 700 comprises a control portion 701, a user input interface portion 702, and a communication portion 703.

The user input interface portion 702 comprises a setup control mode display 752. The setup control mode display 752 comprises setup control display and selection elements 753. The setup control display and selection elements 753 comprise a mode selection element 753a and a measurement device selection element 753b. The mode selection element 753a may be used to select a mode in which the multi-mode dimensional metrology user interface device 700 will operate (e.g., measurement mode 110, combination mode 120, computation mode 130, or model interaction mode 140). In the embodiment shown in FIG. 7, the entirety of the setup control mode display 752 may be used for the mode selection element 753a by responding to a swipe gesture left or right to scroll through available modes. It should be appreciated that this is exemplary only and not limiting and many alternative selection structures may be utilized for the mode selection element 753a such as a drop down menu or a list box. The measurement device selection element 753b may be used to select one or more measurement devices from which the communication portion 703 may input measurement data. In some embodiments, the measurement device selection element 753b may comprise an area marked "devices" which a user may hold to bring forth a device selection menu 754 which shows measurement devices which are available for input to the multi-mode dimensional metrology user interface device 700.

Figure 8:
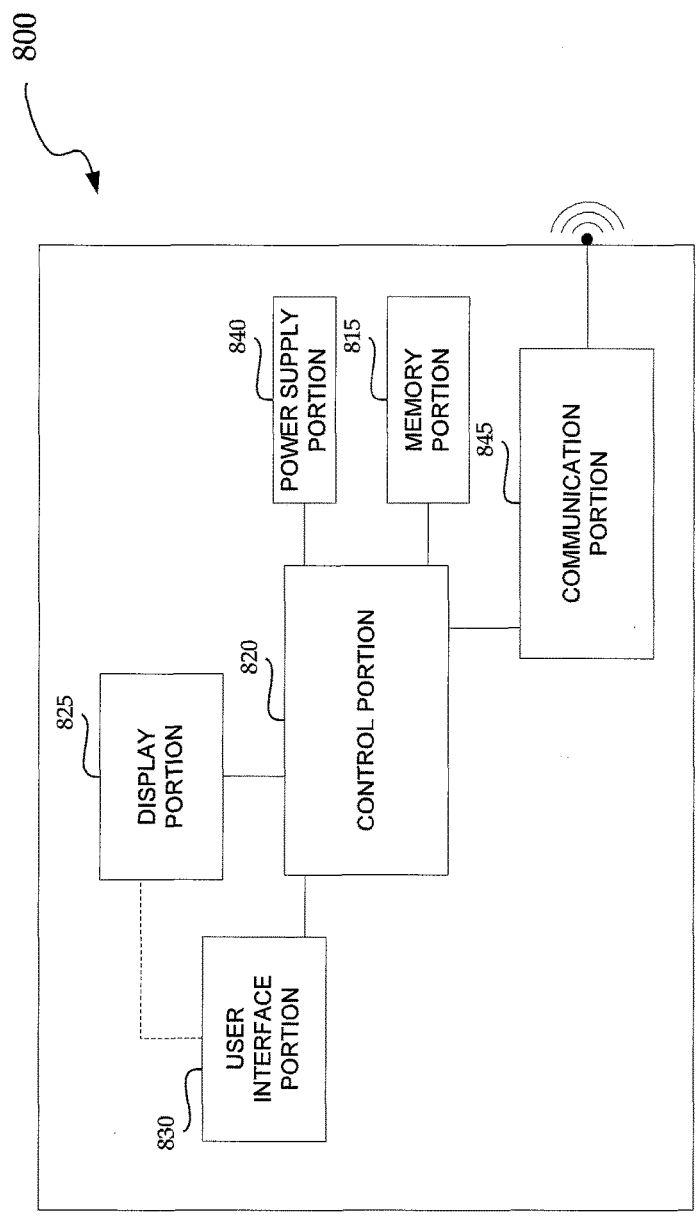
FIG. 8 is a block diagram of a remote display device.

FIG. 8 is a block diagram of a remote display device 800. As will be described in more detail below with respect to FIG. 9, the remote display device 800 may be configured to operate as a device in a metrology personal area network which may also include a dimensional metrology user interface device and dimensional metrology measurement devices (e.g., digital calipers, digital "dial" gauges, height gauges, micrometers, indicators, etc.). While operating in a metrology personal area network, the remote display device 800 may display real time measurement values from one or more of the measurement devices. As shown in FIG. 8, the remote display device 800 includes a memory portion 815, a control portion 820, a display portion 825, a user interface portion 830, a power supply portion 840, and a communication portion 845. The various portions of the remote display device 800 may be interconnected by one or more power and signal bus connections, or by individual dedicated connections. Various signal interconnections may be made by wireless and/or optical means, etc.

The memory portion 815 includes a storage medium, which may be used to save various operating instructions or routines, data, etc. In various exemplary implementations the memory portion 815 may include ROM and/or RAM memory, and may be merged with, or indistinguishable from, the control portion 820. The control portion 820 controls the general operations of the remote display device 800, and provides the output to the display portion 825. As will be described in more detail below with respect to FIG. 9, in various implementations the control portion 820 may be configured to operate the remote display device 800 in at least one of a first mode (e.g., a slave mode) or a second mode (e.g., an independent mode). In a slave mode, the remote display device 800 is responsive to control instructions that are received through the communication portion 845 (e.g., wirelessly) from a dimensional metrology user interface device to configure a display of real time measurement values from one or more measurement devices. In an independent mode, the remote display device 800 is configurable to display real time measurement values from one or more measurement devices without receiving control instructions from a dimensional metrology user interface device.

The user interface portion 830 allows a user to control the operations of the remote display device 800 (e.g., touchscreen, control buttons, etc.). In some implementations, user input may also be provided through an optional voice recognition portion (not shown) which may include a microphone and circuitry sufficient to provide corresponding signals to the control portion 820. Techniques for recording and processing voice commands are described in more detail in U.S. Pat. Nos. 8,676,904 and 8,978,263, each of which is hereby incorporated herein by reference in its entirety.

In various implementations, the power supply portion 840 may include a self-contained power source which provides power for operating the other components of the remote display device 800. The communication portion 845 may comprise suitable signal conditioning and/or interface protocol circuitry, as well any desired connector configuration(s), such that other devices on the metrology personal area network may be interfaced to the remote display device 800. Portions of the communication portion 845 may be provided by, or merged with and indistinguishable from, the control portion 820. The communication portion 845 may also include a wired or wireless transmitting/receiving unit, which is used to transmit or receive information to or from other devices usable in combination with the remote display device 800. Such devices may provide programs, instructions, etc., that are created remotely from the remote display device 800. The programs, instructions, etc., may be downloaded or executable under control of the control portion 820 through the communication portion 845.

Figure 9:
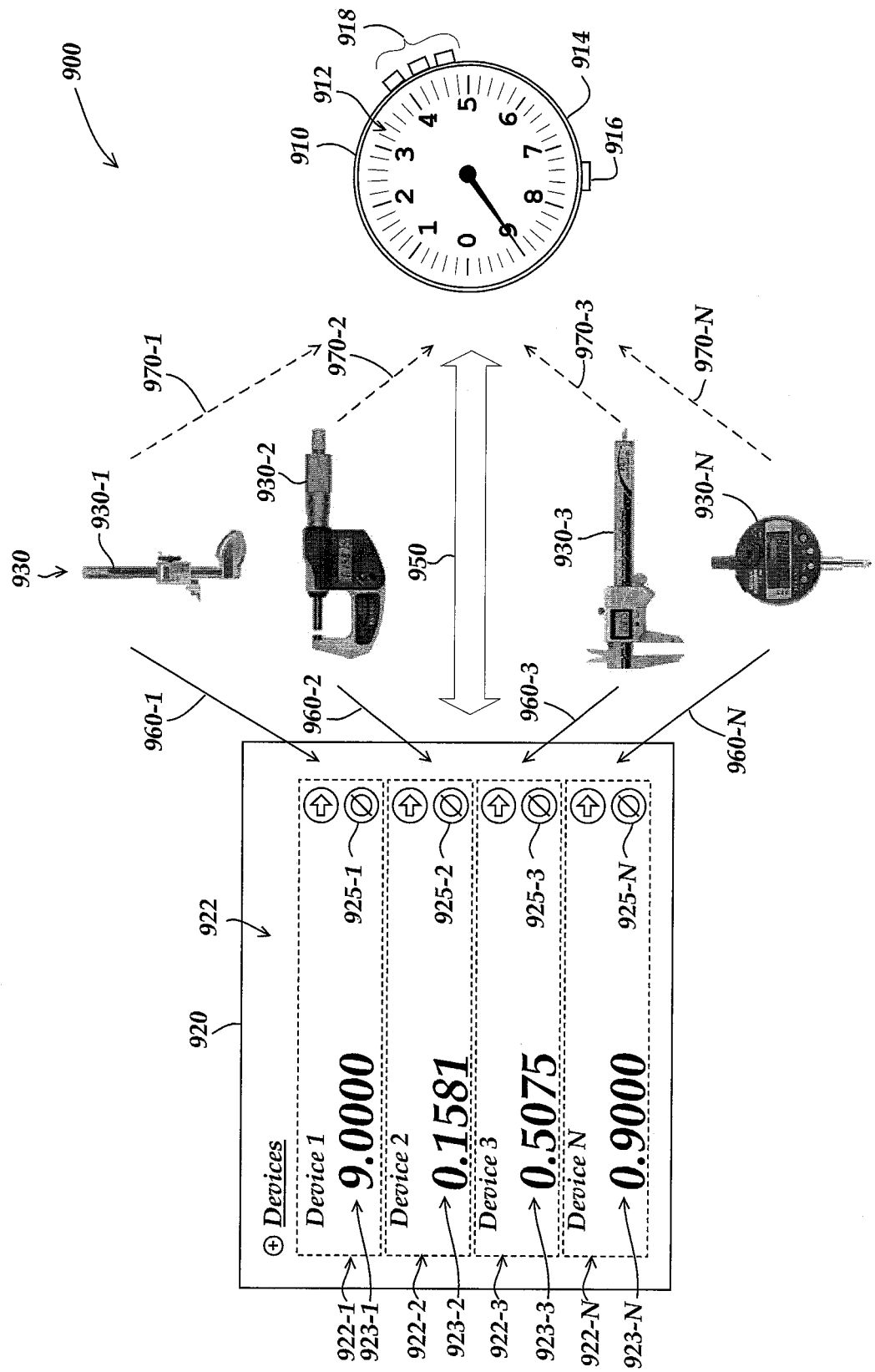
FIG. 9 is a diagram illustrating a metrology personal area network.
Figure 10:
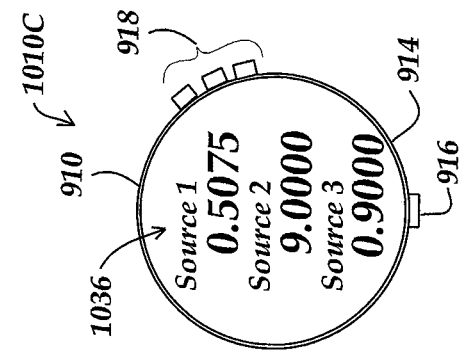
FIGS. 10A-10C are diagrams illustrating selections of measurement devices for which real time measurement values will be displayed on a remote display device.

FIG. 9 is a diagram illustrating a metrology personal area network ("MPAN") 900. As shown in FIG. 9, the MPAN 900 includes a remote display device 910, a dimensional metrology user interface device 920, and dimensional metrology measurement devices 930. In various implementations, the remote display device 910 may be similar or identical to the remote display device 800 of FIG. 8, and the dimensional metrology user interface device 920 may be similar or identical to one or more of the multi-mode dimensional metrology user interface devices described above with respect to FIGS. 1-7. The remote display device 910 may have a first display 912, the dimensional metrology user interface device 920 may have a user interface display 922, and each measurement device 930 may have its own device display.

In various implementations, the remote display device 910 may have a limited size and limited capabilities. For example, the first display 912 (e.g., which may have an outer edge 914 around its perimeter) may be relatively small (e.g., such as having a two-inch or smaller diameter). A base element 916 may allow the remote display device 910 to remain supported in an upright orientation and/or may include an input port or other features for communications and/or attachment of other physical support structures, etc. Buttons 918 (e.g., manual control buttons, etc.) may be provided (e.g., for toggling or scrolling between and/or selecting various options presented on the user interface in the display 912, such as for selecting between different measurement devices and/or display format arrangements, etc.).

The remote display device 910 is configured to operate as a device in the MPAN 900, and to display on the display 912 real time measurement values (e.g., from one or more of the dimensional metrology measurement devices 930). The measurement devices 930-1 to 930-N each include at least one displacement sensor. In various implementations, the measurement devices 930-1 to 930-N may consist of various types of devices (e.g., calipers, micrometers, gauges, dial indicators, lathes, linear scales, etc.). In the illustration of FIG. 9, the measurement devices 930-1, 930-2, 930-3 and 930-N are respectively designated as "Device 1", "Device 2", "Device 3", and "Device N". It will be appreciated that the "Device N" designation indicates that in various implementations there may be additional measurement devices 930 (e.g., a "Device 4", a "Device 5", etc.) included in the MPAN 900.

As will be described in more detail below with respect to FIGS. 10-13, real time measurement values may be displayed on the display 912 of the remote display device 910 according to various display format arrangements (e.g., including in some instances digital values, go/no-go values, computed values, graphical representations, etc.). An example display format arrangement is shown on the display 912, which indicates a measurement value of 9.0 (e.g., as corresponding to measurement data from the "Device 1"). The specific example display format arrangement on the display 912 will be described in more detail below with respect to a display format arrangement 1240 of FIG. 12. In various implementations, display format arrangements may vary and/or may be customized in terms of size, location, orientation, color, units, etc. In various implementations, certain display format arrangements may include at least one number or letter on the display that is related to or representative of a workpiece measurement performed by at least one measurement device 930.

In certain implementations, at least one display format arrangement may include at least one visual indicator (i.e., meaning a non-numerical indicator of a measurement characteristic), such as a pointer that "rotates" around the display (e.g., as will be described in more detail below with respect to a display format arrangement 1230 of FIG. 12). In certain implementations, at least one display format arrangement may include a representation of a function which may be modified by a user (e.g., "if dimension>3 mm, then NG", or "output=3.14159*dimension", etc.). In certain implementations, at least one display format arrangement may include a graphical or "quasi-analog" display of a measurement value (e.g., as will be described in more detail below with respect to a display format arrangement 1220 of FIG. 12). In certain implementations, at least one display format arrangement may include a statistical display of a plurality of workpiece measurements from one or more measurement devices 930 (e.g., as will be described in more detail below with respect to a display format arrangement 1280 of FIG. 12).

In certain implementations, at least one display format arrangement may utilize at least one of a computation mode or a combination display mode, such as those described above with respect to FIGS. 1-7. For example, the computation mode may be configured to compute a value based on the measurement values from at least two measurement devices 930. The combination display mode may be configured to plot a graph of values from at least two measurement devices 930. In certain implementations, at least one display format arrangement may be made to accurately reflect and/or mimic the device display of a measurement device 930 (e.g., in terms of screen shape, pixel characteristics, etc.). In certain implementations, the internal characteristics of a measurement device 930 may be downloaded, or an identifier may be downloaded to recall a corresponding display format arrangement and/or to provide, activate and/or deactivate certain display format options and other features presented in a display format arrangement. In certain implementations, a display format arrangement may be different than that of a device display of a measurement device (e.g., including "go/no-go" values, computed values, graphical representations, etc.). In certain implementations, the remote display device may also be configurable according to a copying function which includes copying a display format arrangement from another remote display device.

As noted above, in various implementations the remote display device 910 is configured to be operated in at least one of a first mode (e.g., a slave mode) or a second mode (e.g., an independent mode). In a slave mode, the remote display device 910 is responsive to control instructions that are received from the dimensional metrology user interface device 920 to configure a display of real time measurement values from one or more of the measurement devices 930 on the display 912 of the remote display device 910. In an independent mode, the remote display device 910 is configurable to display real time measurement values from one or more of the measurement devices 930 on the display 912 without receiving control instructions from the dimensional metrology user interface device 920 (e.g., if the dimensional metrology user interface device 920 is unavailable or is otherwise not present on the MPAN 900, etc.)

In various implementations, one or more measurement devices 930 from which the real time measurement values are to be displayed may be automatically selected from a set of available measurement devices 930 in accordance with various factors. For example, the one or more measurement devices 930 may be automatically selected according to which measurement devices are within a selected transmitting distance (e.g., within three meters, etc.), or are otherwise closest to, the remote display device 910. As another example, a measurement device 930 may be automatically selected according to which measurement device is most recently active for taking a measurement.

In various implementations, the dimensional metrology user interface device 920 may include a user interface display 922 which may in some instances display real time measurement values from the measurement devices 930, which may be in addition to the display of real time measurement values on the remote display device 910. In various implementations, the measurement devices 930 may each include a displacement or position sensor for producing the measurement values, but the dimensional metrology user interface device 920 and the remote display device 910 may not themselves include any displacement or position sensors. In the example of FIG. 9, the user interface display 922 is shown to display numerical real time measurement values 923-1, 923-2, 923-3 and 923-N from four selected measurement devices 930-1, 930-2, 930-3 and 930-N in display areas 922-1, 922-2, 922-3 and 922-N, respectively. Each of the display areas 922-1, 922-2, 922-3 and 922-N also includes respective zero setting selection elements 925-1, 925-2, 925-3 and 925-N, which are configured to set the measurement values to zero. This may assist a user in determining relative positions for a cut, for example, when operating a lathe tool. The dimensional metrology user interface device 920 also includes at least one control interface operable to transmit control instructions to the remote display device 910, measurement devices 930, and/or other devices that are connected to the MPAN 900.

In various implementations, the measurement devices 930 may transmit real time measurement data (e.g., including and/or corresponding to real time measurement values) to the dimensional metrology user interface device 920, which may then transmit at least some measurement data from at least some of the measurement devices to the remote display device 910. The remote display device 910 may also or alternatively receive measurement data that is transmitted directly from the measurement devices 930 to the remote display device 910. More specifically, the measurement devices 930-1 to 930-N may utilize communication links 960-1 to 960-N (e.g., wireless links) for transmitting real time measurement data to the dimensional metrology user interface device 920 and/or may utilize communication links 970-1 to 970-N (e.g., wireless links) for transmitting real time measurement data to the remote display device 910. The dimensional metrology user interface device 920 may utilize a communication link 950 (e.g., a wireless link) for transmitting control instructions, real time measurement data, etc., to the remote display device 910. The remote display device 910 may also utilize the communication link 950 for communicating with the dimensional metrology user interface device 920 (e.g., to confirm instructions, respond to status or other requests, send data, etc.). The dimensional metrology user interface device 920 may also utilize the communication links 960-1 to 960-N to transmit control instructions to the measurement devices 930-1 to 930-N, respectively. In various implementations, the remote display device 910 may have limited capabilities (e.g., may not have the capability to send control instructions to other devices on the MPAN 900, etc.)

In various implementations, the remote display device 910 may be configured to automatically be operated in a slave mode when the MPAN 900 includes a dimensional metrology user interface device 920. The remote display device 910 may also be configured to automatically be operated in an independent mode when the MPAN 900 includes one or more measurement devices 930 and does not include a dimensional metrology user interface device 920. In various implementations, in the slave mode the remote display device may be configurable according to a first set of display format arrangement options that is larger than a second set of display format arrangement options that the remote display device can be configured according to in the independent mode. More specifically, the remote display device 910 may in some instances have limited capabilities, for which the dimensional metrology user interface device 920 may be capable of providing additional options for the display format arrangements. Various examples of display format arrangements will be described in more detail below with respect to FIGS. 10-13.

It will be appreciated that the remote display device 910 may be utilized in some instances for viewing measurement data from a measurement device 930 that is hard to view when in use. For example, a measuring process for a particular dimension of an object may require that a measurement device 930 (e.g., a caliper) be utilized in a confined area, or underneath a large object, etc. In such instances, the device display (e.g., of the caliper) may be difficult to view while measurement operations are being performed. The remote display device may address this issue by displaying the real time measurement values from the measurement device while being located in an easily viewable location.

In various implementations, the remote display device 910 may be configurable according to various configuration modes. For example, as will be described in more detail below, a device select mode, a display type mode, a remote view mode, a display properties mode, a multiple configuration mode and/or a security mode may be utilized for configuring the remote display device 910. In various implementations, a device select mode may be operated according to various modes, such as a manual mode, an active mode, a priority mode or a copying mode. As will be described in more detail below with respect to FIGS. 10A-10C, in a manual mode, in one specific implementation a user may be enabled to view a menu of measurement devices on a selection screen and to select one or more of the measurement devices from the menu. As will be described in more detail below with respect to FIG. 11, in an active mode, one or more measurement devices may be displayed based on an active change in measurement values from a measurement device (e.g., displaying a real time measurement value from a measurement device which has most recently been moved or otherwise active for providing updated measurement data). As will also be described in more detail below with respect to FIG. 11, in a priority mode, a measurement device may be selected as a priority measurement device for which real time measurement values are displayed in a primary display area. In some instances, a priority mode may be utilized in combination with other modes (e.g., an active mode in which a secondary location dynamically displays the most recently active measurement device).

It will be appreciated that one or more of the measurement devices 930 will typically include their own device displays which display real time measurement values, wherein such real time measurement values may correspond to the real time measurement values that are displayed on the first display 912 of the remote display device 910. In certain instances, the display of the real time measurement values on the first display 912 is according to a display format arrangement that mimics that of the device display of the particular measurement device 930. In some instances, the display of the real time measurement values on the first display 912 is according to a display format arrangement which is different than that of the device display of the particular measurement device (e.g., as will be described in more detail below with respect to FIG. 12). For example, such different display format arrangements may in some instances include go/no-go values, computed values, graphical values, etc.

In one type of copying mode, the remote display device 910 may copy at least a portion of the user interface display 922 of the dimensional metrology user interface device 920 (e.g., as including real time measurement values). In some implementations, the remote display device 910 may be configured to copy only a portion of the user interface display 922, or may copy the entire user interface display 922.

FIGS. 10A-10C are diagrams of user interfaces 1010A-1010C illustrating a manual selection mode in which one or more measurement devices may be manually selected. As shown in FIG. 10A, a user interface 1010A may be provided which enables a user to perform various selection actions, as will be described in more detail below. In various implementations, the user interface 1010A may be provided on a remote display device, a dimension metrology user interface device, or other device of a metrology personal area network. As will be described in more detail below with respect to FIG. 10C, after the selections have been made, a remote display device 910 is configured to display real time measurement values from the selected measurement devices.

In the user interface 1010A, a scrollable list 1012 is provided which includes selectable measurement devices for which real time measurement values may be displayed. An arrow bar 1014 indicates a range of the scrollable list 1012, and may include interactive features which a user may swipe or otherwise move (e.g., using a finger) to scroll up or down the scrollable list 1012. When a user wishes to select a measurement device from the scrollable list 1012, the user may perform a selection action 1015 (e.g., using a finger) to move the selected measurement device over to a selected list 1016. It will be appreciated that through such a process, in addition to the selections of the measurement devices, the user is also able to place the selected measurement devices in a desired order in the selected list 1016. In various implementations, a user may select only a single measurement device, multiple measurement devices, or all of the available measurement devices from the scrollable list 1012. When the user has finished selecting and/or ordering the measurement devices for the selected list 1016, the user may select a "done" button 1018 to indicate the completion of the selections. As shown in FIG. 10B, in a user interface 1010B, a display is provided of a selected list 1026, which in various implementations may be further configurable. For example, one or more display format arrangements may further be selected for each selected measurement device (e.g., as will be described in more detail below with respect to FIG. 13).

As shown in FIG. 10C, a user interface 1010C (e.g., as provided on the remote display device 910) displays a list 1036 of real time measurement values from the selected measurement devices. In various implementations, the selected measurement devices may include particular designations in the user interface 1010C. For example, in the particular example of FIG. 10C, "Source 1" corresponds to "Device 3", "Source 2" corresponds to "Device 1", and "Source 3" corresponds to "Device N" from the selected list 1016 of the user interface 1010A. As illustrated in the user interface 1010C, the real time measurement values have been displayed in a numerical format. It will be appreciated that in various implementations the particular designations (e.g., "Source 1", "Source 2", "Source 3", etc.), may be utilized to simplify the understanding of the list for a viewer of the remote display device 910. In alternative implementations, the original "Device 3", "Device 1", "Device N", etc., designations may be maintained and/or utilized in combined labels (e.g., "Source 1/Device 3") in the user interface 1010C. In various implementations, other types of designations may alternatively or additionally be utilized (e.g., "Caliper 1", "Dial Gauge 1", etc.) to further aid a user's understanding of which measurement device is the source of the real time measurement values that are displayed.

Figure 11:
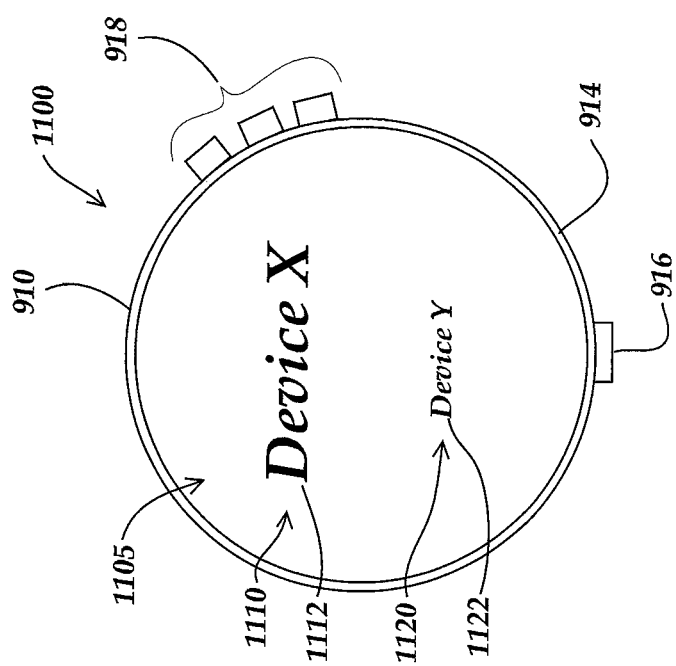
FIG. 11 is a diagram of a user interface with a configurable display format arrangement for a remote display device.

FIG. 11 is a diagram of a user interface 1100 with a configurable display format arrangement 1105 for a remote display device 910. The display format arrangement 1105 includes a first display area 1110 in which real time measurement values from a first measurement device 1112 (e.g., illustrated as a "Device X") are displayed, and a second display area 1120 in which real time measurement values from a second measurement device 1122 (e.g., illustrated as a "Device Y") are displayed. In one implementation, the first display area 1110 may be operated according to a priority mode wherein the priority measurement device (e.g., device X), is always displayed in the display area 1110. In contrast, the second display area 1120 may be designated for an automatically selected device which may vary (e.g., currently "Device Y").

With respect to the specific example of FIG. 11, the varying measurement device in the display area 1120 may be selected based on various factors. For example, the measurement device may be selected according to which measurement device was most recently moved or otherwise active for providing updated measurement data (e.g., was most recently utilized for taking a measurement). In various implementations, an exception to the display area 1120 displaying the most recently active device may occur if the most recently active device is the same as the priority device that is displayed in the display area 1110. In such an instance, the display area 1120 may be made to display the second most recently active device. In alternative implementations, it will be appreciated that the display format arrangement 1105 may be modified (e.g., to display only a single measurement device, to display additional measurement devices, to alter or move the display areas in which the measurement devices are displayed, etc.). Additional display format arrangements and corresponding modifications will be described in more detail below with respect to FIG. 12.

Figure 12:
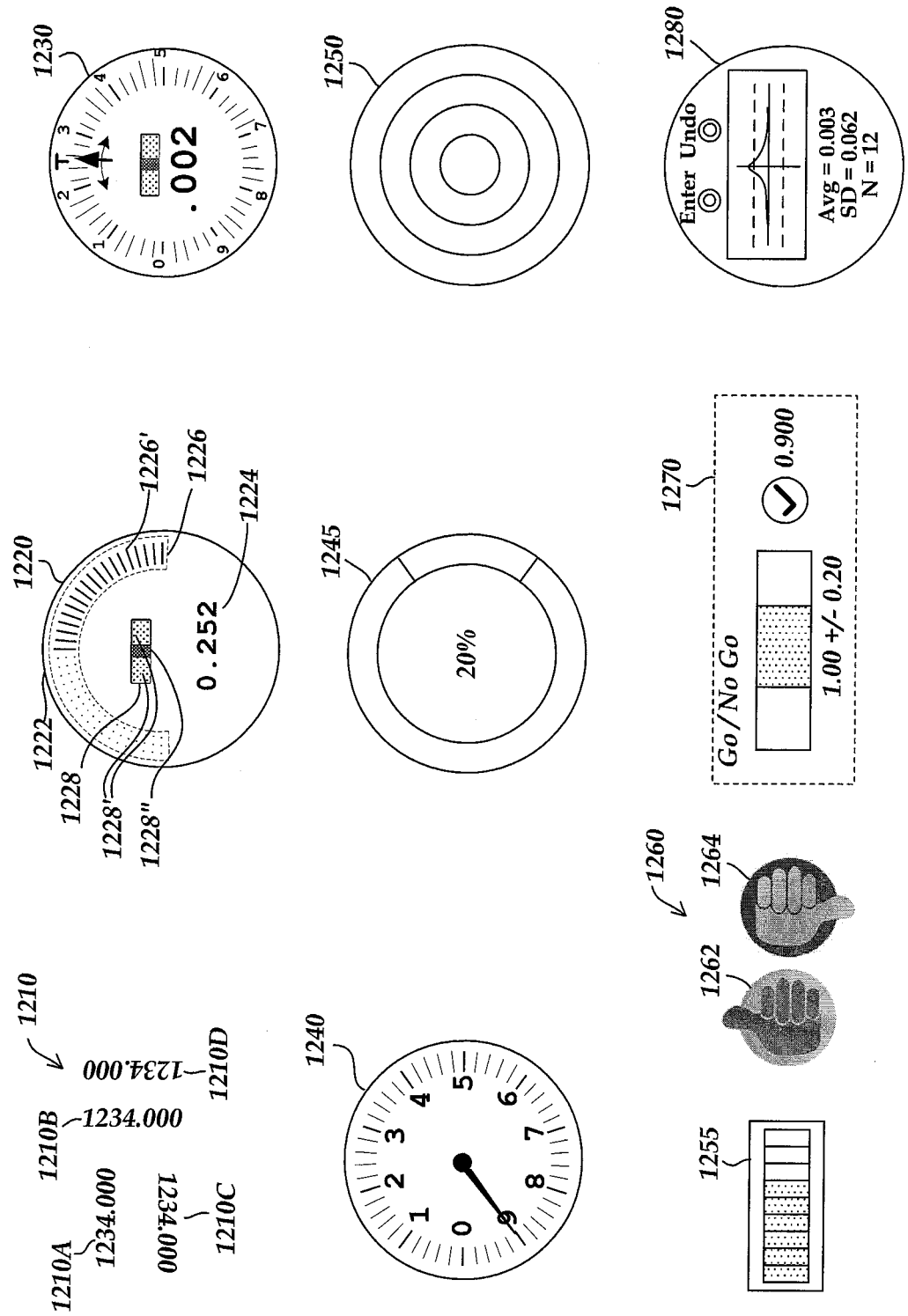
FIG. 12 is a diagram illustrating various display format arrangements for a remote display device.

FIG. 12 is a diagram illustrating various display format arrangements 1210-1280 for a remote display device. As shown in FIG. 12, a display format arrangement 1210 includes a numerical value display, for which an orientation 1210A-1210D may further be selected. For example, a first orientation 1210A is illustrated with zero degrees of rotation, while a second orientation 1210B is illustrated with 90 degrees of rotation, a third orientation 1210C is illustrated with 180 degrees of rotation, and a fourth orientation 1210D is illustrated with 270 degrees of rotation. In various implementations, additional orientation options may also be provided. It will be appreciated that by allowing the orientation of one or more elements of a display format arrangement to be selected and/or adjusted, a user is provided with greater control and flexibility regarding how the display format arrangements will be presented and viewed.

It will be appreciated that while numerical values are illustrated in the different selectable orientations 1210A-1210D, any of the other types of display format arrangements or elements thereof as described herein may similarly have selectable orientations. In various implementations, an orientation may be automatically selected according to certain inputs. For example, a sensor that responds to gravity or otherwise determines the current orientation of the remote display device may be utilized to determine the appropriate orientation of a display format arrangement. As other examples, metadata based on the measurement device type, user preferences, etc., may be utilized to determine an appropriate orientation. In addition, an analysis may be performed to determine if a display format arrangement will be selected that does not require orientation adjustments (e.g., a "universal orientation" display format arrangement 1250 as will be described in more detail below).

A display format arrangement 1220 is shown to include a border 1222, measurement numbers 1224, a visual indicator 1226 (e.g., meaning a non-numerical indicator of a measurement characteristic) and a visual indicator 1228. The visual indicator 1226 comprises a quasi-analog tolerance measurement representation comprising measurement scale increments 1226', which may individually toggle between absence or presence in response to the measurement value (or changes in the measurement value) relative to a target value. The visual indicator 1228 comprises a tolerance measurement representation comprising a color zone 1228" (e.g., a green zone) corresponding to an "in tolerance" measurement value, and color zones 1228' (e.g., red zones) corresponding to an "out of tolerance" measurement value. Each of the color zones may toggle between color absence or presence in response to the measurement value (or changes in the measurement value) relative to a target value.

A display format arrangement 1230 illustrates a visual indicator comprising a circular scale with numbered increments and a quasi-analog pointer that points to the measurement value on the scale, with a measurement number that represents a deviation from a target measurement value (e.g., a target value as may be set according to known methods), as well as a visual indicator comprising an in/out of tolerance representation (e.g., such as the visual indicator 1228) located in the middle. A display format arrangement 1240 illustrates an incremented circular scale with a quasi-analog pointer element in the middle which "rotates" to indicate a measurement value. In an alternate implementation, a smaller quasi-analog pointer element and corresponding smaller incremented circular scale or other element may be provided which indicates a larger order of magnitude of a measurement according to the number of full rotations of the quasi-analog pointer element, similar to other known meters and/or gauges.

A display format arrangement 1245 includes both graphical and numerical indications (e.g., for which a percentage is shown in the middle and a circle includes a colored or highlighted portion that corresponds to the percentage shown). For example, the percentage (e.g., 20%) may indicate the percentage of a current measurement value relative to a target value. A display format arrangement 1250 includes an analog "target" display, for which different highlighting or color changes of the different rings of the target may indicate the proximity of a current measurement value to a target value. As noted above, the display format arrangement 1250 may have particular advantages for certain applications, in that it has a "universal" orientation, such that the representation of the measurement values may be properly viewed and understood regardless of a viewing location or orientation of a user relative to the remote display device.

A display format arrangement 1255 includes a bar indicator, in which sections are highlighted or changed in color to represent a current measurement value relative to a target value. A display format arrangement 1260 includes symbols corresponding to a "go/no-go" representation. More specifically, a first element 1262 (e.g., represented as a "thumbs-up" symbol) may be displayed and/or may be highlighted (e.g., with a changed color) in order to indicate if a current measurement value corresponds to a "go" determination relative to a target value, while a second element 1264 (e.g., represented as a "thumbs-down" symbol) may be displayed and/or highlighted (e.g., with a changed color) to indicate a "no-go" determination relative to a target value. A display format arrangement 1270 includes a visual indicator comprising an in/out of tolerance representation (e.g., similar to the visual indicator 1228) and a go/no-go representation (e.g., a checked circle), as well as a numerical value that represents a real time measurement value, and a numerical indication of a tolerance for deviation from a target value (e.g., 1.0+/−0.20).

A display format arrangement 1280 provides a graphical display along with numerical representations of statistical measurement data. In one implementation, the display format arrangement 1280 may provide a bar chart or other graphical representation of multiple measurements that have been taken with one or more measurement devices (e.g., similar in some instances to processes described above with respect to FIGS. 1-7). When the display is a touch screen type display, the display format arrangement 1280 may also comprise the touch-sensitive "soft" control button representations labeled "Enter" and "Undo".

In various implementations, different display format arrangements (e.g., such as the display format arrangements 1210-1280 of FIG. 12) may be stored in multiple locations of an MPAN, and the display format arrangements may be retrieved from any location at which they are stored. For example, certain display format arrangements may be stored on the remote display device, or remotely on the dimensional metrology user interface device, or in a separate database, etc. In various implementations, a menu structure may include issuing a command for retrieving available display format arrangements, for which available display format arrangements may be presented for selection. Once a display format arrangement is retrieved and/or modified, a user may be enabled to select where the display format arrangement is to be stored (e.g., on the remote display device, on a dimensional metrology user interface device, in a database, etc.). In various implementations, certain security settings may be utilized for preserving the display format arrangements. For example, in a high security mode no user changes may be allowed, while in a medium security mode, a user may be allowed to modify some properties but not the items displayed. In a low security mode, a user may have complete control for modifying the display format arrangements and configurations of the remote display device.

In various implementations, the properties of a display format arrangement may be modified through user selection actions on the remote display device. In addition, in various implementations user selection actions (e.g., swiping, tapping, etc.) may also be performed on the dimensional metrology user interface device or on one of the measurement devices. For example, on a measurement device such as a caliper, the caliper slider may be utilized as an input device to dynamically change inputs by controlling size, position, scaling, etc. Display format arrangement properties that may be configurable may include size, position, color, type, effects (e.g., flashing), font, scaling, etc. As further examples, a highlight mode may be utilized wherein the real time measurement values that are to be highlighted may be modified by various techniques, such as being moved to the top of the user interface of the remote display device, having an enlarged font or size, a changed color, a flashing display, etc. Such properties may also be selected in an automatic property selection mode, where the measurement data is analyzed (e.g., by the remote display device and/or the dimensional metrology user interface device), on the basis of which properties may be selected automatically.

It will be appreciated that the various display format arrangements shown in FIG. 12 are intended to be illustrative and not limiting (e.g., fewer or more display format arrangements may be included). As previously described, a display format arrangement for a remote display device may be selected for displaying real time measurement values corresponding to measurement data from one or more measurement devices. As will be described in more detail below with respect to FIGS. 13A and 13B, in various implementations different display format arrangements may be selected for different measurement devices.

Figure 13:
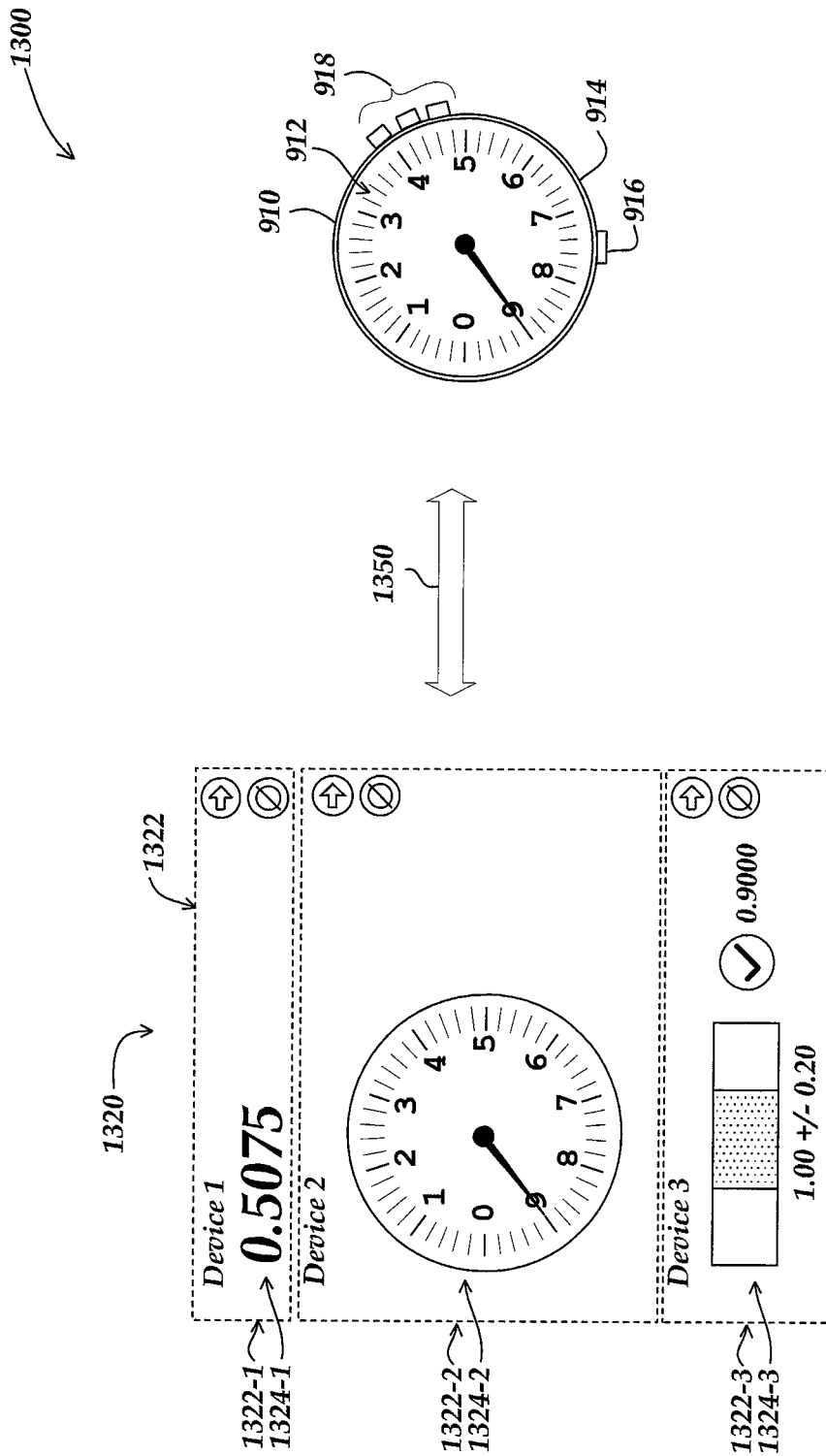
FIG. 13 is a diagram of a user interface illustrating different display format arrangements that have been selected for different measurement devices in a metrology personal area network.

FIG. 13 is a diagram of a user interface 1322 illustrating different display format arrangements that have been selected for different measurement devices in an MPAN 1300. In various implementations, the user interface 1322 (or portions thereof) may be included on a remote display device or on a dimensional metrology user interface device (e.g., similar to the user interface display 922 of FIG. 9). As shown in the user interface 1322, display areas 1322-1, 1322-2 and 1322-3 include real time measurement values for different measurement devices (e.g., "Device 1", "Device 2", and "Device 3", respectively).

In the particular example of FIG. 13, the real time measurement values are displayed in display format arrangements 1324-1, 1324-2 and 1324-3 that are selected for each measurement device. More specifically, the display format arrangement 1324-1 for the "Device 1" includes a numerical value (e.g., similar to the display format arrangement 1210A of FIG. 12). The display format arrangement 1324-2 for the "Device 2" includes an incremented circular scale with quasi analog pointer in the middle which "rotates" to indicate a measurement value (e.g., similar to the display format arrangement 1240 of FIG. 12). The display format arrangement 1324-3 for the "Device 3" includes a combination of various elements (e.g., similar to the display format arrangement 1270 of FIG. 12). A user interface device 1320 that supports the user interface 1322 may utilize a communication link 1350 (e.g., a wireless link) for transmitting control instructions, real time measurement data, etc., to the remote display device 910. The remote display device 910 may also utilize the communication link 1350 for communicating with the user interface device 1320 (e.g., to confirm instructions, respond to status or other requests, send data, etc.).

In various implementations, once a display format arrangement has been selected for each measurement device, the remote display device 910 may display corresponding real time measurement values for one or more of the measurement devices. For example, in one implementation the remote display device 910 may be configured to display real time measurement values from a "most recently active" measurement device. In the particular example of FIG. 13, the remote display device 910 is displaying the real time measurement values from "Device 2" (e.g., in accordance with "Device 2" being the most recently active or otherwise most recently selected measurement device). Thus, on the remote display device 910, the real time measurement values are displayed according to the designated display format arrangement 1324-2 for the "Device 2". Similarly, if the "Device 1" or the "Device 3" had currently been selected, the real time measurement value would be displayed on the remote display device 910 according to the display format arrangement 1324-1 or 1324-3, respectively. In various implementations, real time measurement values from two or more measurement devices may be displayed at the same time. As one specific illustrative example, the display format arrangements 1324-1 and 1324-3 for the "Device 1" and the "Device 3" could in some instances both be displayed on the remote display device 910 at the same time, similar to the configurations described above with respect to FIGS. 10A and 11.

With respect to FIGS. 12 and 13, it will be appreciated that in various implementations, a display format arrangement for a particular measurement device may be selected manually or automatically. More specifically, in a manual mode, a user may select a display format arrangement for each measurement device (e.g., utilizing a menu of display format arrangements, such as those illustrated in FIG. 12). In one implementation, a user may perform a manual selection action (e.g., tapping or holding on a display format arrangement) in order to select a particular display format arrangement for a designated measurement device. In an automatic mode, measurement data from a particular measurement device may be analyzed to determine an appropriate display format arrangement for the measurement device. For example, measurement data that is changing slowly and/or infrequently may in some instances be appropriately represented in a display format arrangement with digital or analog values (e.g., including auto scaling of analog gauge type displays), with appropriate resolution to prevent excessive flicker. In comparison, measurement data that is rapidly changing may in some instances be better represented in a display format arrangement with analog trending display characteristics such as bar graphs, color changing displays, etc., which may be provided with an appropriate range and/or resolution for monitoring trends or other appropriate characteristics. In one implementation, at least one display format arrangement may be automatically selected for mimicking a device display of a selected measurement device.

Figure 14:
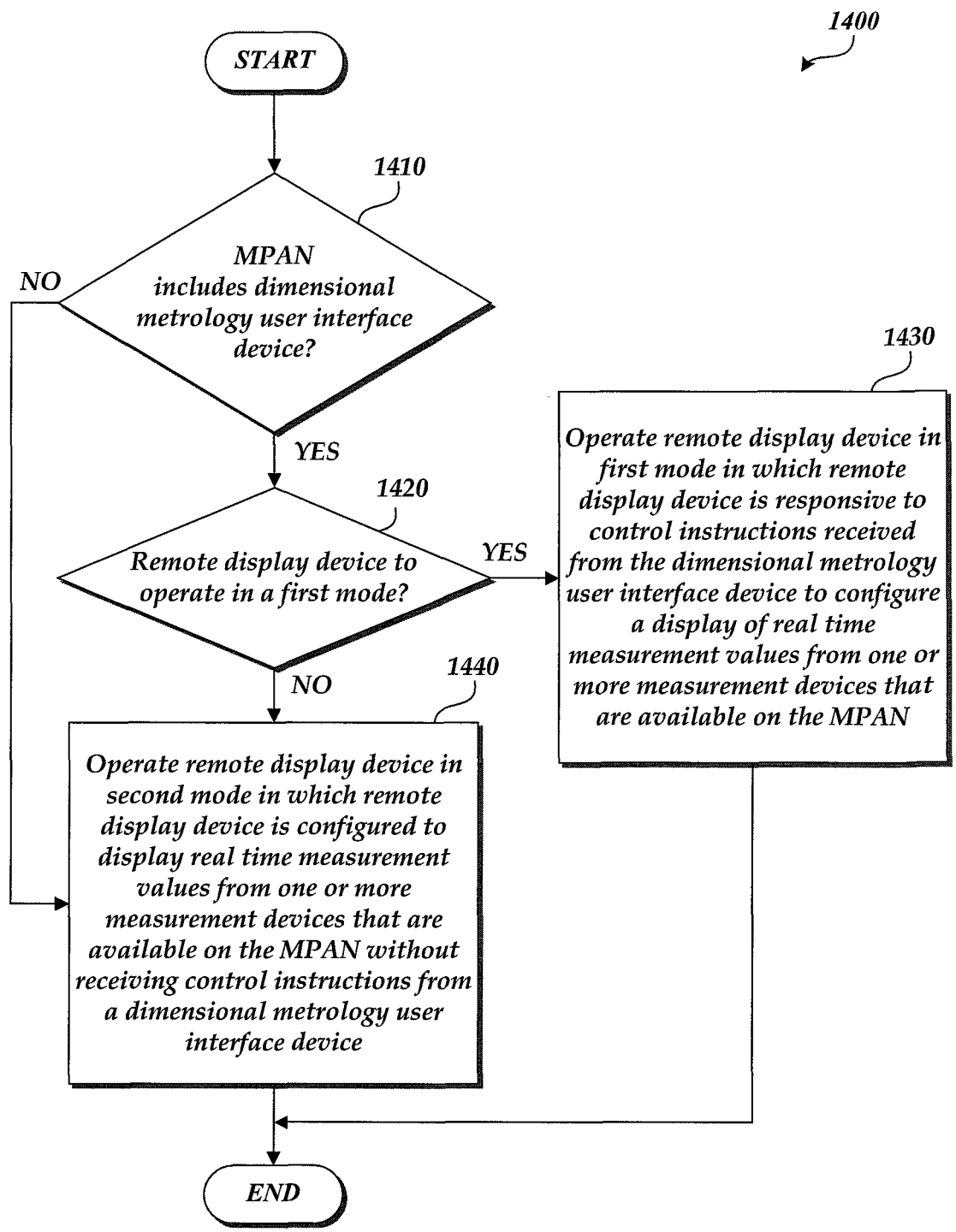
FIG. 14 is a flow diagram illustrating one exemplary implementation of a routine for operating a remote display device.

FIG. 14 is a flow diagram illustrating one exemplary implementation of a routine 1400 for operating a remote display device. At a decision block 1410, a determination is made as to whether an MPAN includes a dimensional metrology user interface device. If it is determined that the MPAN does not include a dimensional metrology user interface device, the routine continues to a block 1440, as will be described in more detail below. If it is determined that the MPAN does include a dimensional metrology user interface device, the routine continues to a decision block 1420, where a determination is made as to whether the remote display device will operate in a first mode. If the remote display device is to operate in a first mode, the routine continues to a block 1430 where the remote display device is operated in the first mode. When operating in the first mode, the remote display device is responsive to control instructions received from the dimensional metrology user interface device to configure a display of real time measurement values from one or more measurement devices that are available on the MPAN.

If at decision block 1420 it is determined that the remote display device is not to be operated in the first mode, or if at decision block 1410 it is determined that the MPAN does not include a dimensional metrology user interface device, the routine proceeds to the block 1440 where the remote display device is operated in a second mode. As part of the second mode, the remote display device is configured to display real time measurement values from one or more measurement devices that are available on the MPAN. The real time measurement values are displayed on a first display of the remote display device without receiving control instructions from a dimensional metrology user interface device.

Various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The embodiments of the invention in which an exclusive property or privilege is claimed are defined as follows:

1. A remote display device for displaying real time measurement values and configured to operate as a device in a metrology personal area network ("MPAN") which also includes at least a dimensional metrology user interface device which includes no displacement or position sensors and one or more dimensional metrology measurement devices which each include at least one displacement or position sensor, the dimensional metrology user interface device including a user interface display which displays real time measurement values that are received from the one or more dimensional metrology measurement devices and which includes at least one control interface operable to transmit control instructions to devices connected to the MPAN, the remote display device comprising:

a control portion;
a first display;
a user interface portion; and
a communication portion,
wherein:
the remote display device control portion is configured to operate the remote display device in at least a first mode in which the remote display device is responsive to control instructions received from the dimensional metrology user interface device to configure a display of real time measurement values from the one or more dimensional metrology measurement devices on the first display.

2. The remote display device of claim 1, wherein:
the remote display device control portion is further configured to operate the remote display device in at least a second mode in which it is configurable to display real time measurement values from one or more dimensional metrology measurement devices on the first display without receiving control instructions from a dimensional metrology user interface device.

3. The remote display device of claim 2, wherein:
the remote display device control portion is further configured to automatically operate the remote display device in the first mode when it is present on an MPAN that includes a dimensional metrology user interface device; and
the remote display device control portion is further configured to automatically operate the remote display device in the second mode when it is present on an MPAN that includes one or more dimensional metrology measurement devices and does not include a dimensional metrology user interface device.

4. The remote display device of claim 2, wherein:
in the first mode the control instructions received from the dimensional metrology user interface device allow the remote display device to be configured according to a first set of display format arrangement options; and
in the second mode the remote display device is configurable according to a second set of display format arrangement options that is smaller than the first set of display format arrangement options.

5. The remote display device of claim 2, wherein the remote display device does not include any displacement or position sensors.

6. The remote display device of claim 2, wherein the first mode comprises a slave mode during which the remote display device does not have the capability to send control instructions to control another device.

7. The remote display device of claim 2, wherein as part of the configuration of the remote display device during at least one of the first or second modes, at least one display format arrangement is selected for determining how at least some of the real time measurement values will be presented on the first display.

8. The remote display device of claim 7, wherein the at least one display format arrangement is automatically selected for mimicking the device display of a dimensional metrology measurement device for which the real time measurement values are to be displayed on the first display.

9. The remote display device of claim 2, wherein during at least one of the first or second modes the one or more dimensional metrology measurement devices are automatically selected from a plurality of measurement devices according to which dimensional metrology measurement devices of the plurality of dimensional metrology measurement devices are within a transmitting distance of the remote display device which is at most 3 meters.

10. The remote display device of claim 1, wherein the one or more dimensional metrology measurement devices are selected from a plurality of dimensional metrology measurement devices.

11. The remote display device of claim 10, wherein one of the one or more dimensional metrology measurement devices is automatically selected according to which dimensional metrology measurement device of the plurality of dimensional metrology measurement devices has most recently been active for taking a measurement.

12. The remote display device of claim 10, wherein one of the one or more dimensional metrology measurement devices is automatically selected according to which dimensional metrology measurement device of the plurality of dimensional metrology measurement devices is closest to the remote display device.

13. The remote display device of claim 10, wherein the user interface display of the dimensional metrology user interface device displays real time measurement values from each of the plurality of dimensional metrology measurement devices but the first display of the remote display device only displays real time measurement values from the selected one or more dimensional metrology measurement devices.

14. The remote display device of claim 1, wherein the largest dimension of the first display is less than two inches.

15. The remote display device of claim 1, further comprising a self-contained power source.

16. The remote display device of claim 1, wherein at least one of the one or more dimensional metrology measurement devices has its own device display which displays real time measurement values that correspond to real time measurement values that are displayed on the first display.

17. The remote display device of claim 16, wherein the display of the real time measurement values on the first display is according to a display format arrangement that mimics that of the device display.

18. The remote display device of claim 16, wherein the display of the real time measurement values on the first display is according to a display format arrangement which is different than that of the device display and which includes at least one of go/no-go values, computed values or graphical values.

19. The remote display device of claim 1, wherein the remote display device is configurable according to a copying function which includes copying a display format arrangement from another remote display device.

20. The remote display device of claim 1, wherein the real time measurement values from the one or more dimensional metrology measurement devices are displayed on the first display as at least one of digital values, go/no-go values, computed values or graphical values.

21. The remote display device of claim 1, wherein the orientation in which the real time measurement values are presented on the first display is determined according to a selection of a display orientation from a plurality of available display orientations.

22. The remote display device of claim 1, wherein the one or more dimensional metrology measurement devices include a plurality of dimensional metrology measurement devices.

23. The remote display device of claim 1, wherein the one or more dimensional metrology measurement devices include at least one of a caliper, micrometer, gauge, dial indicator, lathe or linear scale.

24. The remote display device of claim 1, wherein the first mode includes at least one of:
a) a computation mode configured to compute a value based on measurement values from at least two dimensional metrology measurement devices; and
b) a combination display mode configured to plot a graph of values from at least two dimensional metrology measurement devices.

25. A metrology personal area network ("MPAN"), comprising:
one or more dimensional metrology measurement devices which each include at least one displacement or position sensor;
a dimensional metrology user interface device including a user interface display which displays real time measurement values that are received from the one or more dimensional metrology measurement devices and which includes at least one control interface operable to transmit control instructions to devices connected to the MPAN; and
a remote display device for displaying real time measurement values and configured to operate as a device in the MPAN, the remote display device comprising:
a control portion;
a first display;
a user interface portion; and
a communication portion,
wherein:
the remote display device control portion is configured to operate the remote display device in at least a first mode in which the remote display device is responsive to control instructions received from the dimensional metrology user interface device to configure a display of real time measurement values from the one or more dimensional metrology measurement devices on the first display.

26. The MPAN of claim 25, wherein:

the remote display device control portion is further configured to operate the remote display device in at least a second mode in which it is configured to display real time measurement values from one or more dimensional metrology measurement devices on the first display without receiving control instructions from a dimensional metrology user interface device.

27. A method for operating a remote display device for displaying real time measurement values, the remote display device including a control portion, a first display, a user interface portion, and a communication portion, wherein the remote display device is configured to operate as a device in a metrology personal area network ("MPAN") which also includes one or more dimensional metrology measurement devices which each include at least one displacement or position sensor, the method comprising:

determining if the MPAN includes a dimensional metrology user interface device, wherein a dimensional metrology user interface device includes a user interface display which displays real time measurement values that are received from the one or more dimensional metrology measurement devices and which includes at least one control interface operable to transmit control instructions to devices connected to the MPAN;

operating the remote display device in a first mode if it is determined that the MPAN includes a dimensional metrology user interface device, wherein as part of the first mode the remote display device is responsive to control instructions received from the dimensional metrology user interface device to configure a display of real time measurement values from the one or more dimensional metrology measurement devices on the first display; and operating the remote display device in a second mode if it is determined that the MPAN does not include a dimensional metrology user interface device, wherein as part of the second mode the remote display device is configured to display real time measurement values from one or more dimensional metrology measurement devices on the first display without receiving control instructions from a dimensional metrology user interface device.

* * * * *